US011942711B2

(12) United States Patent
Kobayashi

(10) Patent No.: US 11,942,711 B2
(45) Date of Patent: Mar. 26, 2024

(54) ELECTRICAL CONNECTOR WITH ELECTRICAL TERMINALS

(71) Applicant: HIROSE ELECTRIC CO., LTD., Kanagawa (JP)

(72) Inventor: Yuki Kobayashi, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 202 days.

(21) Appl. No.: 17/557,234

(22) Filed: Dec. 21, 2021

(65) Prior Publication Data

US 2022/0209444 A1 Jun. 30, 2022

(30) Foreign Application Priority Data

Dec. 28, 2020 (JP) ................................. 2020-218847

(51) Int. Cl.
*H01R 12/71* (2011.01)
*H01R 12/70* (2011.01)

(52) U.S. Cl.
CPC ......... *H01R 12/716* (2013.01); *H01R 12/707* (2013.01)

(58) Field of Classification Search
CPC .. H01R 12/716; H01R 12/707; H01R 43/205; H01R 12/73; H01R 13/04; H01R 12/57; H01R 13/10
See application file for complete search history.

(56) References Cited

U.S. PATENT DOCUMENTS

| | | | | |
|---|---|---|---|---|
| 2010/0048041 A1* | 2/2010 | Lei | H01R 13/20 | 439/74 |
| 2010/0099293 A1* | 4/2010 | Lei | H01R 13/2442 | 439/345 |
| 2010/0151702 A1* | 6/2010 | Chen | H01R 12/707 | 439/65 |
| 2011/0045679 A1* | 2/2011 | Yu | H01R 12/716 | 439/74 |
| 2013/0244486 A1* | 9/2013 | Ohsaka | H01R 13/60 | 439/581 |
| 2017/0005423 A1 | 1/2017 | Takenaga et al. | | |
| 2017/0033510 A1* | 2/2017 | Ozeki | H01R 43/205 | |
| 2019/0280409 A1* | 9/2019 | Hoshiba | H01R 13/646 | |
| 2021/0320441 A1* | 10/2021 | Maeda | H01R 12/716 | |
| 2022/0140512 A1* | 5/2022 | Amemori | H01R 13/6581 | 439/259 |
| 2022/0209444 A1* | 6/2022 | Kobayashi | H01R 12/73 | |

FOREIGN PATENT DOCUMENTS

JP 2017-16897 A 1/2017

* cited by examiner

*Primary Examiner* — Abdullah A Riyami
*Assistant Examiner* — Nelson R. Burgos-Guntin
(74) *Attorney, Agent, or Firm* — RANKIN, HILL & CLARK LLP

(57) ABSTRACT

Provided is a connector which includes: an insulating housing; and a conductive terminal, in which the terminal is fixed to the housing, and includes a mounting portion connected to a board and a contact portion protruding from the mounting portion in a fitting direction, and a thickness of the contact portion is greater than a thickness of the mounting portion in a direction perpendicular to the board.

11 Claims, 12 Drawing Sheets

ELECTRICAL CONNECTOR WITH ELECTRICAL TERMINALS

CROSS-REFERENCE TO RELATED APPLICATION

This application claims priority from Japanese Patent Application No. 2020-218847 filed with the Japan Patent Office on Dec. 28, 2020, the entire content of which is hereby incorporated by reference.

BACKGROUND

1. Technical Field

The present disclosure relates to a connector.

2. Related Art

Typically, a board-to-board connector has been used as a connector for connecting board surfaces to each other. In the board-to-board connector, a plug connector and a receptacle connector are provided in a pair. The plug connector is inserted into the receptacle connector, and conductive terminals (contacts) of these connectors contact each other. Accordingly, the receptacle connector and the plug connector are electrically connected to each other. Examples of a technique relating to such a board-to-board connector include a technique described in JP-A-2017-16897.

SUMMARY

A connector according to embodiments of the present disclosure is configured to include: an insulating housing; and a conductive terminal, in which the terminal is fixed to the housing, and includes a mounting portion connected to a board and a contact portion protruding from the mounting portion in a fitting direction, and a thickness of the contact portion is greater than a thickness of the mounting portion in a direction perpendicular to the board.

DETAILED DESCRIPTION

Figure 1:
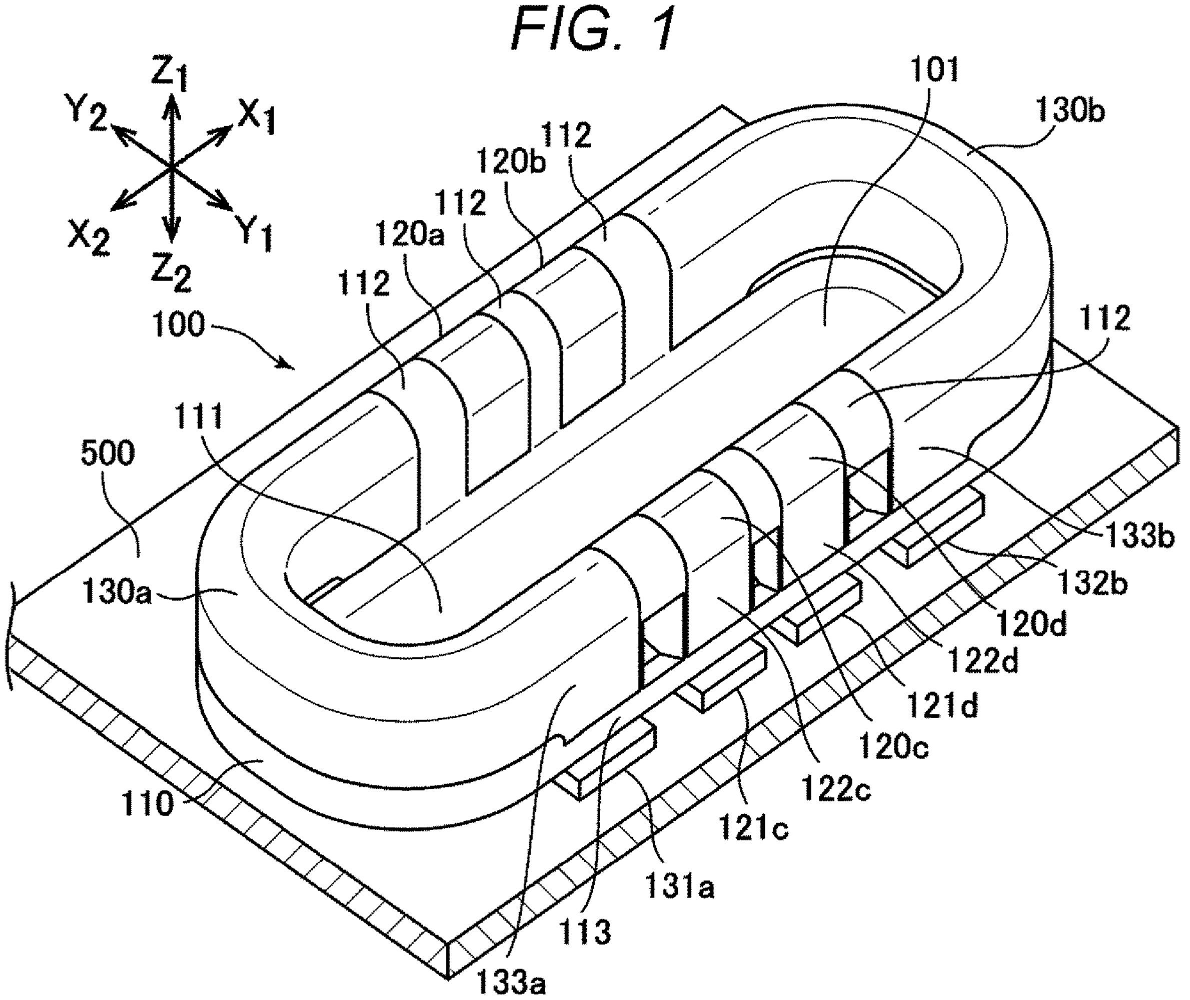
FIG. 1 is a perspective view showing the configuration of a connector (a plug connector) according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With a demand for reduction in the weight, thickness, and length of electronic equipment such as a smartphone, a mobile phone, and a mobile information terminal, components used for such electronic equipment have been recently reduced in size and thickness. With enhancement of the function of the electronic equipment, tendency shows, however, that current used for such electronic equipment also increases. In many cases, a rechargeable battery is, as a power supply, generally used for the electronic equipment. However, charging time reduction has been also demanded for the rechargeable battery. In the case of using the rechargeable battery, high current flows in a small connector in some cases.

The present disclosure has been made for solving the above-described problems. An object of the present disclosure is to provide a connector satisfying a demand for reduction in the weight, thickness, and length of electronic equipment, suppressing a connector conductive terminal resistance low, and configured adaptable to a higher current flowing in a connector conductive terminal.

The above-described object of the present disclosure and other objects and new features of the present disclosure will be apparent from description of the present specification and the attached drawings.

Among embodiments disclosed in the present application, the summary of a representative embodiment will be briefly described as follows.

A connector according to the embodiments of the present disclosure includes: an insulating housing; and a conductive terminal, in which the terminal is fixed to the housing, and includes a mounting portion connected to a board and a contact portion protruding from the mounting portion in a fitting direction, and a thickness of the contact portion is greater than a thickness of the mounting portion in a direction perpendicular to the board.

Among the embodiments disclosed in the present application, advantageous effects obtained by the representative embodiment will be briefly described as follows.

(1) The thickness t1 of the contact portion is greater so that the conductor resistance of the terminal can be decreased. Accordingly, a greater amount of current can be applied to the terminal.

(2) The metal volume of the terminal is increased so that the strength of the connector can be improved.

(3) The thickness t2 of the mounting portion is less than the thickness t1 of the contact portion so that reduction in the height of the connector can be achieved.

Hereinafter, the embodiments of the present disclosure will be described in detail based on the drawings. Note that in all figures for describing the embodiments, the same reference numerals are used to represent the same members in principle and repeated description thereof will be omitted.

When required in the following embodiments for the sake of convenience, multiple sections or multiple embodiments will be dividedly described. Unless otherwise specified, these sections or embodiments are not independent of one another. One of the embodiments is in a relationship with some or all of the other embodiments, such as variations, details, or supplementary explanation. In a case where the following embodiments refer to, e.g., the number of elements (including the number of pieces, numerical values, amounts, ranges, and the like), such a number is not limited to a specific number and may be equal to or greater than or equal to or less than the specific number, unless otherwise specified or limited clearly to the specific number in principle.

First Embodiment

Figure 2:
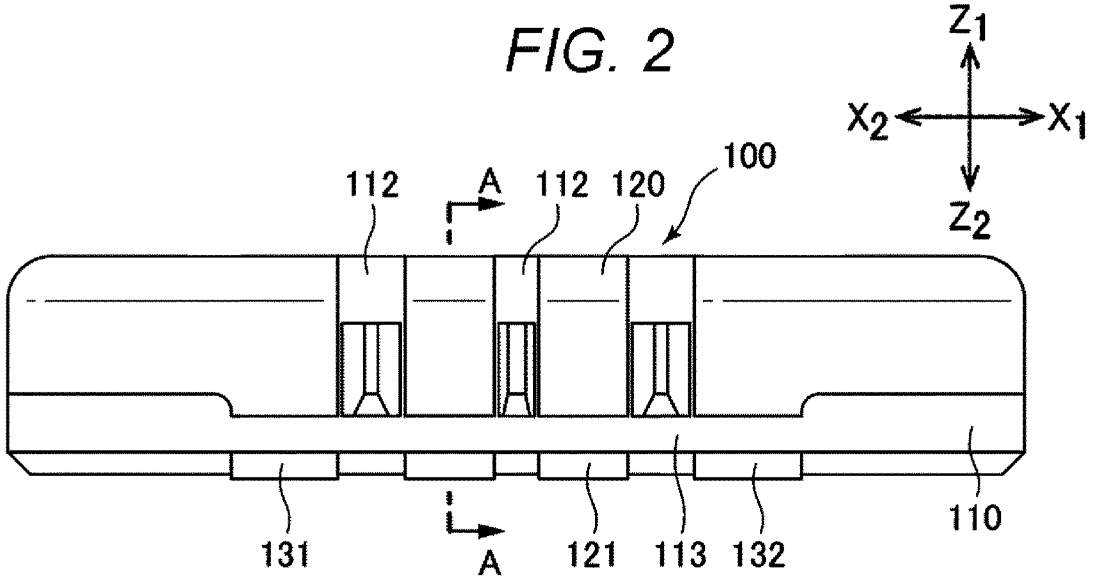
FIG. 2 is a front view showing the configuration of the connector (the plug connector) according to the first embodiment of the present disclosure.
Figure 3:
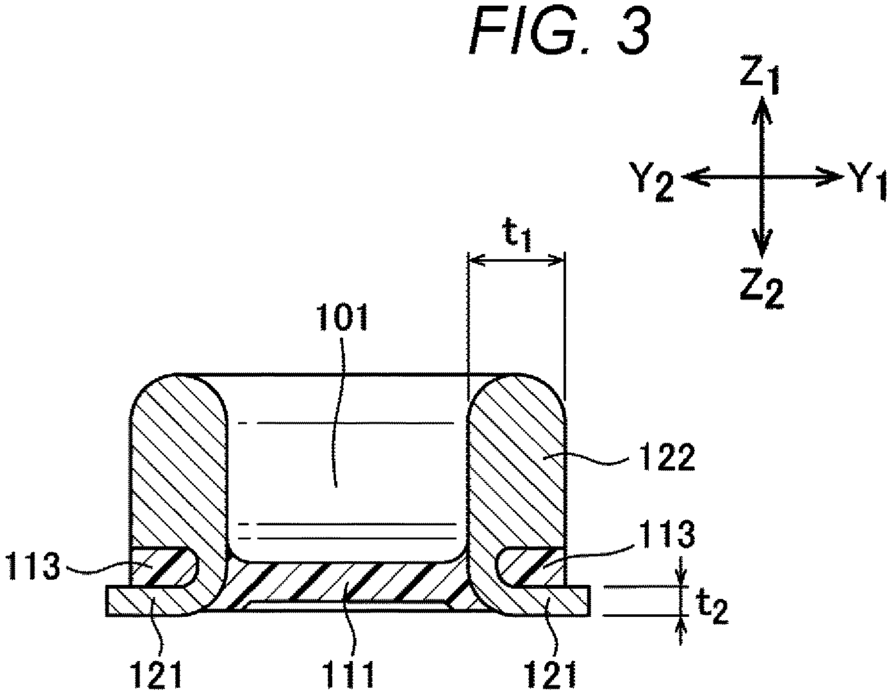
FIG. 3 is a sectional view along an A-A cut plane of FIG. 2.
Figure 4:
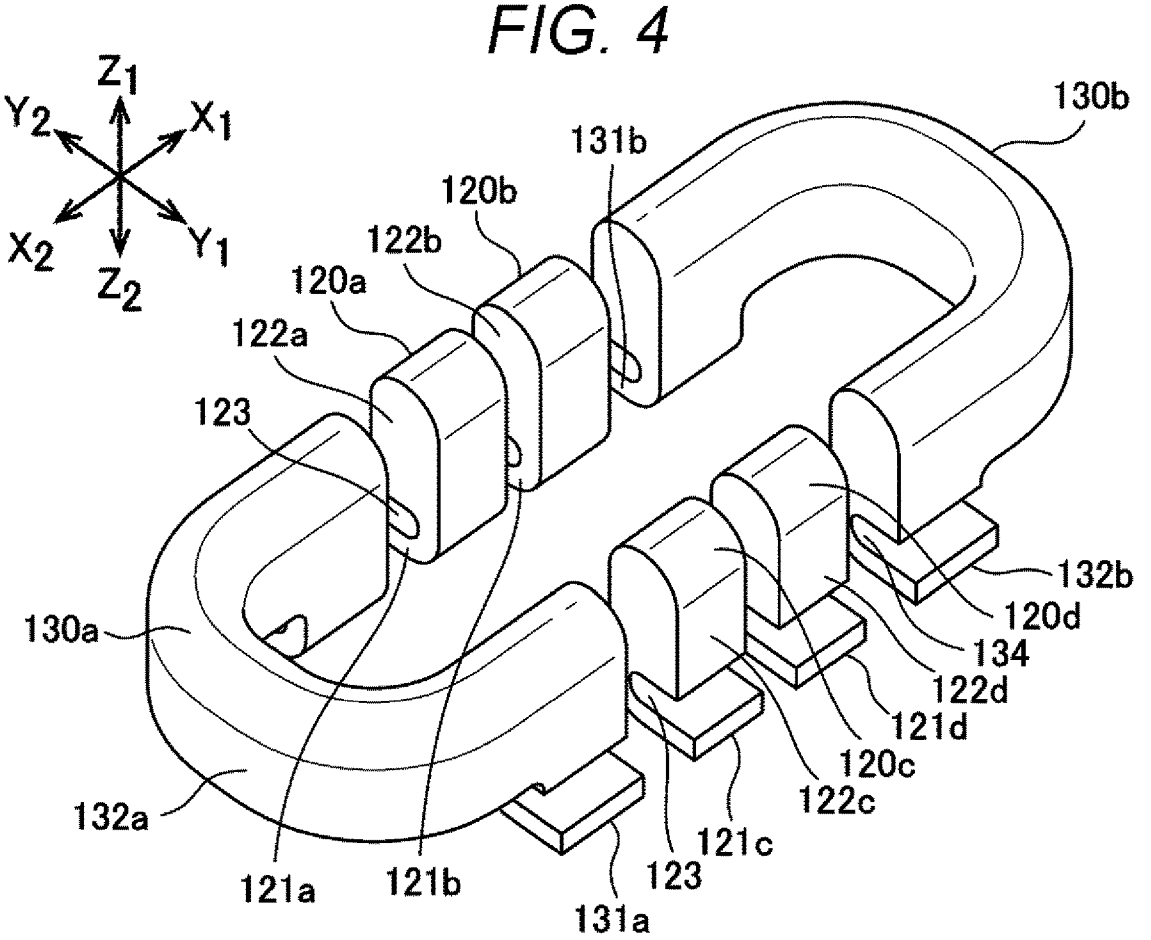
FIG. 4 is a perspective view showing, except for a housing portion, only a terminal configuration in the connector according to the first embodiment of the present disclosure.
Figure 5:
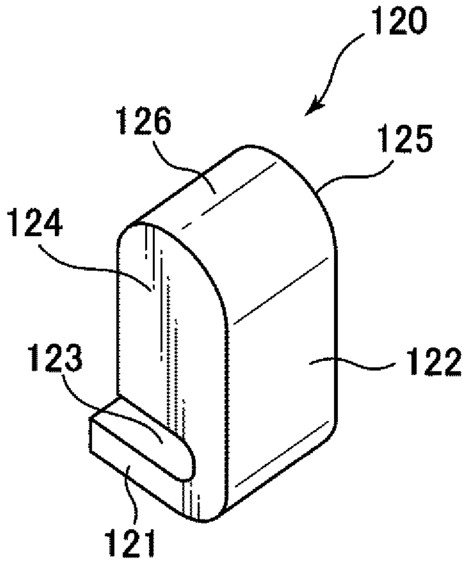
FIG. 5 is a perspective view showing a first terminal configuration in the connector according to the first embodiment of the present disclosure.
Figure 6:
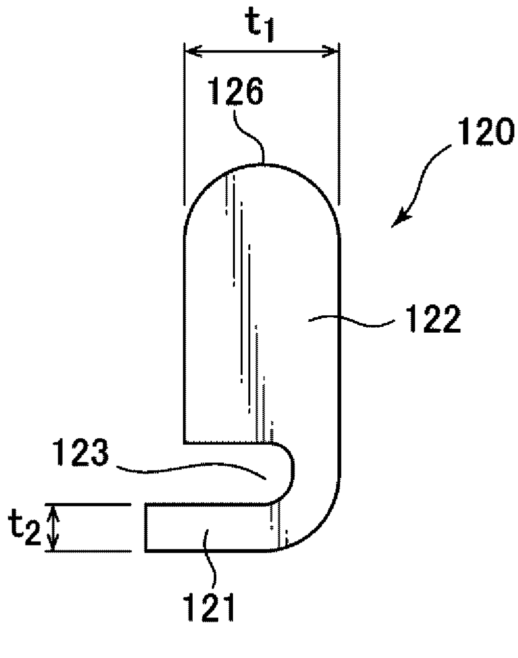
FIG. 6 is a side view showing the first terminal configuration of FIG. 5 in the connector according to the first embodiment of the present disclosure.
Figure 7:
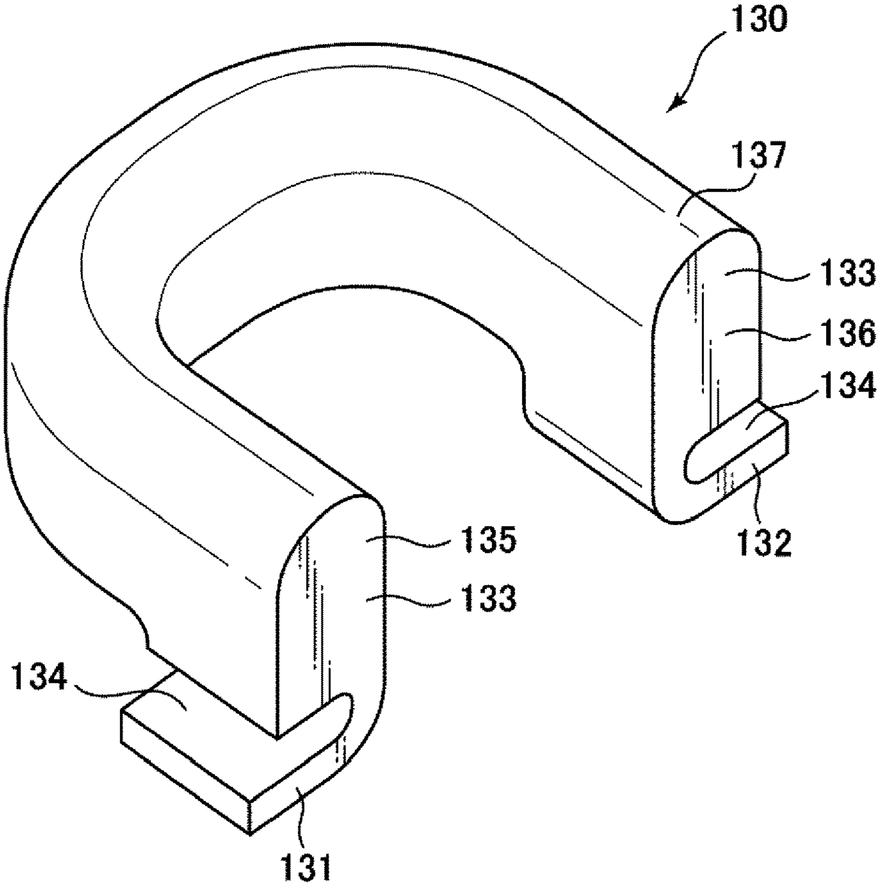
FIG. 7 is a perspective view showing a second terminal configuration in the connector according to the first embodiment of the present disclosure.
Figure 8:
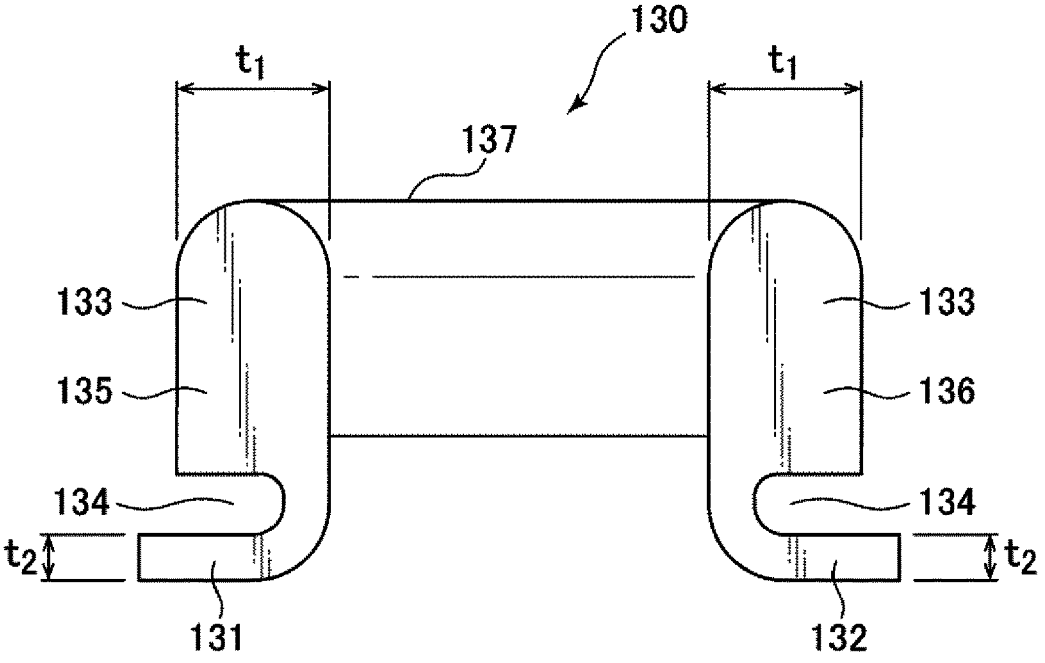
FIG. 8 is a side view showing the second terminal configuration of FIG. 7 in the connector according to the first embodiment of the present disclosure.

FIG. 1 is a perspective view showing the configuration of a connector (a plug connector) according to a first embodiment of the present disclosure, and FIG. 2 is a front view. FIG. 3 is a sectional view along an A-A cut plane of FIG. 2. FIG. 4 is a perspective view showing, except for a housing portion, only terminals in the connector of FIG. 1. FIG. 5 is a perspective view showing a first terminal configuration. FIG. 6 is a side view showing the first terminal configuration of FIG. 5. FIG. 7 is a perspective view showing a second terminal configuration. FIG. 8 is a side view showing the second terminal configuration of FIG. 7.

First, the configuration of the connector according to the first embodiment will be described with reference to FIGS. 1 to 4. The connector of the first embodiment is a plug connector 100 mounted on a board 500 such as a printed circuit board. The plug connector 100 includes an insulating housing 110, four conductive first terminals 120 (120*a* to 120*d*) fixed to the housing 110, and two conductive second terminals 130 (130*a* to 130*b*) fixed to the housing 110. The four first terminals 120*a* to 120*d* have the same shape. The two second terminals 130*a* to 130*b* have the same shape. The second terminals 130*a* to 130*b* are arranged on both end sides of the first terminals 120*a* to 120*d* in a longitudinal direction (an X1X2 direction). The present embodiment describes a case where the four first terminals 120 and the two second terminals 130 are provided, but the present disclosure is not limited to such a case and the number of terminals may be any number. The first terminals 120 and the second terminals 130 are mainly used as signal terminals or power supply terminals, but the terminals are not limited to above and may be used for other purposes such as a reinforcing metal fitting, a frame, or a shield.

For example, a rechargeable battery for a mobile phone or a mobile information terminal, a control circuit thereof, and the like are connected to the board 500. The housing 110 is made of, e.g., insulating resin. The first terminal 120 and the second terminal 130 are made of conductive metal such as copper alloy. For example, the plug connector 100 is formed by a method in which resin is injected to form the housing 110 after the first terminals 120 and the second terminals 130 have been arranged in a die, such as integral molding or insert molding.

The housing 110 includes, for example, a bottom wall 111 forming a bottom surface of a fitting recessed portion 101 of the connector, a side wall 112 standing on the bottom wall 111 to fill a portion between adjacent ones of the terminals, and a terminal fixing portion 113 formed to cover part of the first and second terminals 120, 130. The terminal fixing portion 113 is formed in such a manner that a recessed portion 123 between a mounting portion 121 and a contact portion 122 at each first terminal 120 and a recessed portion 134 between a mounting portion 131, 132 and a contact portion 133 at each second terminal 130 are filled with part of the housing 110.

As shown in FIGS. 4 to 6, each first terminal 120 has the mounting portion 121 to be connected to the board 500 such as the printed circuit board and the contact portion 122 extending to protrude from the mounting portion 121 in a fitting direction (a Z1 direction). The mounting portions 121 of the first terminals 120 are arrayed at positions facing each other in a Y1Y2 direction. Moreover, the first terminal 120 has a greater thickness t1 of the contact portion 122 in a direction (the Y1Y2 direction) parallel with the board 500 than the thickness t2 of the mounting portion 121 in a direction (a Z1Z2 direction) perpendicular to the board 500. For example, the thickness t1 of the contact portion 122 is equal to or greater than twice as much as the thickness t2 of the mounting portion 121. The inside (a lower portion of a fitting surface 126 (a Z2 direction)) of the contact portion 122, i.e., the inside of the fitting surface 126 of the contact portion 122 at a tip end thereof, is filled with conductive metal. The fitting surface 126 of the contact portion 122 at the tip end thereof (the Z1 direction) is rounded.

Of the mounting portion 121 of the first terminal 120, part of a fitting-side (the Z1 direction) surface is covered with part (the terminal fixing portion 113) of the housing 110. The first terminal 120 has the recessed portion 123 between the mounting portion 121 and the contact portion 122, and the inside of the recessed portion 123 is filled with part of the housing 110. With this configuration, the first terminal 120 is fixed to the housing 110, and detachment of the first terminal 120 from the housing 110 is reduced. Moreover, two side surfaces 124, 125 of the contact portion 122 facing each other in the longitudinal direction (the X1X2 direction) closely contact part (the side wall 112) of the housing 110.

The first terminals 120 are arranged at positions facing each other in a width direction (the Y1Y2 direction) of the connector. The mounting portion 121 extends outwardly from below the bottom wall 111 in the width direction (the Y1Y2 direction), and a thickness direction (the Z1Z2 direction) thereof is a direction crossing a surface (an XY plane) of the board 500. The mounting portions 121 are each soldered to separate circuit patterns on the board 500 upon mounting.

As shown in FIGS. 4, 7, and 8, each second terminal 130 has the two mounting portions 131, 132 to be connected to the board 500 such as the printed circuit board and the contact portion 133 extending to protrude from the mounting portions 131, 132 in the fitting direction (the Z1 direction). The contact portion 133 extends in the direction (the XY plane) parallel with the board 500, and electrically connects the mounting portion 131 and the mounting portion 132 to each other. The mounting portion 131 and the mounting portion 132 of the second terminal 130 are arranged at positions facing each other in the Y1Y2 direction. Moreover, the second terminal 130 has a greater thickness t1 of the contact portion 133 in the direction (the Y1Y2 direction) parallel with the board 500 than the thickness t2 of the mounting portion 131, 132 in the direction (the Z1Z2 direction) perpendicular to the board 500. For example, the thickness t1 of the contact portion 133 is equal to or greater than twice as much as the thickness t2 of the mounting portion 131, 132. A fitting surface 137 of the contact portion 133 at a tip end thereof (the Z1 direction) is rounded. The inside (a lower portion of the fitting surface 137 (the Z2 direction)) of the contact portion 133, i.e., the inside of the fitting surface 137 of the contact portion 133 at the tip end thereof, is filled with conductive metal.

Of the mounting portion 131, 132 of the second terminal 130, part of a fitting-side (the Z1 direction) surface is covered with part (the terminal fixing portion 113) of the housing 110. The second terminal 130 has the recessed portion 134 between the mounting portion 131, 132 and the contact portion 133, and the inside of the recessed portion 134 is filled with part of the housing 110. With this configuration, the second terminal 130 is fixed to the housing 110, and detachment of the second terminal 130 from the housing 110 is reduced. Moreover, two side surfaces 135, 136 of the contact portion 133 in the same direction, i.e., the longitudinal direction (the X1X2 direction), closely contact part (the side wall 112) of the housing 110. The two second terminals 130 are arranged on both sides of the first terminals 120, and have a U-shape as viewed from the fitting direction (the Z1 direction). In the present embodiment, the second terminal 130 includes the two mounting portions 131, 132, but the number of mounting portions is not limited to two. The number of mounting portions at one second terminal may be one or three or more.

The mounting portions 131, 132 are arranged apart from each other in the width direction (the Y1Y2 direction) of the connector and extend outwardly from below the bottom wall 111 in the width direction (the Y1Y2 direction), and a thickness direction (the Z1Z2 direction) thereof is a direction crossing the surface (the XY plane) of the board 500. The mounting portions 131, 132 are each soldered to separate circuit patterns on the board 500 upon mounting.

Of each second terminal 130, a portion which is to contact a terminal of a receptacle connector as a partner connector is formed longer in the longitudinal direction (the X1X2 direction) so that high current can be applied to the terminal. Thus, a sufficient contact area between the terminals is ensured.

In the present embodiment, the first terminals 120*a*, 120*b* are arranged adjacent to each other in the longitudinal direction (the X1X2 direction), and are arranged between the second terminal 130*a* and the second terminal 130*b*. Similarly, the first terminals 120*c*, 120*d* are arranged adjacent to each other in the longitudinal direction (the X1X2 direction), and are arranged between the second terminal 130*a* and the second terminal 130*b*. For example, the first terminals 120 are used as signal terminals, and the second terminals 130 are used as power supply terminals.

Next, the method for manufacturing the connector (the plug connector) according to the first embodiment of the present disclosure will be described with reference to FIGS. 9 to 14. FIGS. 9 to 14 are perspective views showing the steps of manufacturing the first terminals 120 and the second terminal 130 of the plug connector 100.

Figure 9:
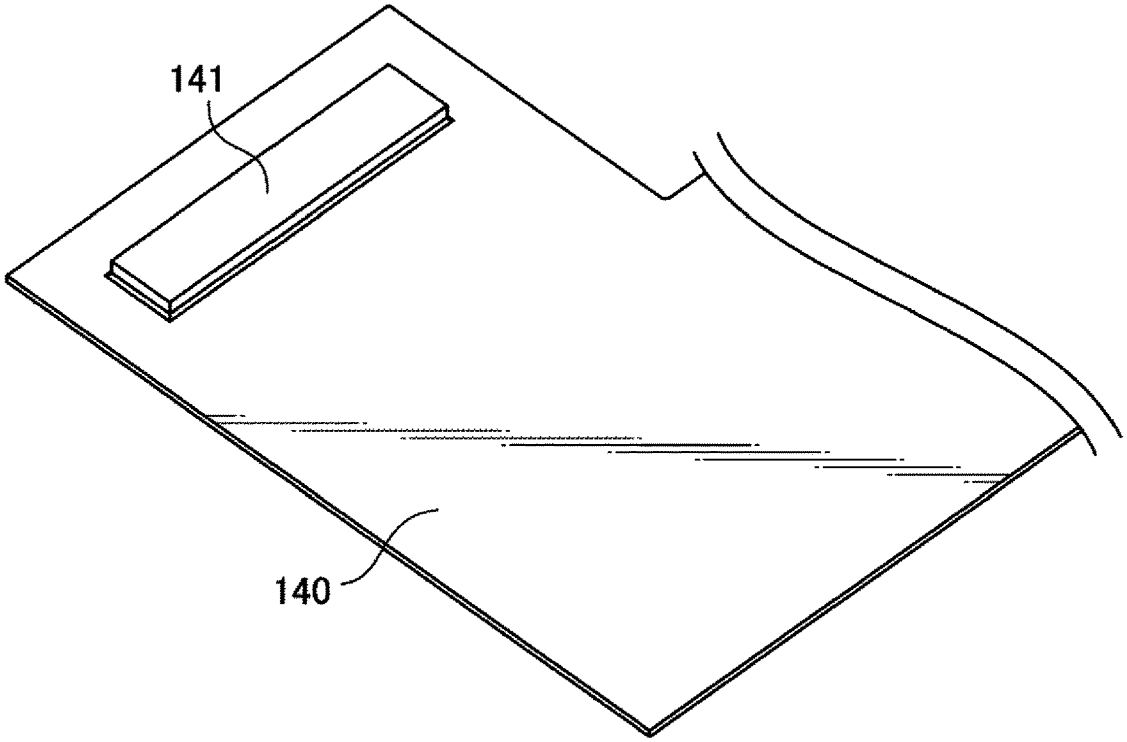
FIG. 9 is a perspective view showing the step of manufacturing terminals of the connector according to the first embodiment of the present disclosure.

First, as shown in FIG. 9, a thick portion 141 is formed at a metal plate 140 by forging. The thickness of the thick portion 141 is equivalent to the thickness t1 of the contact portion 122, 133. Moreover, the thickness of the metal plate 140 is equivalent to the thickness t2 of the mounting portion 121, 131, 132.

Figure 10:
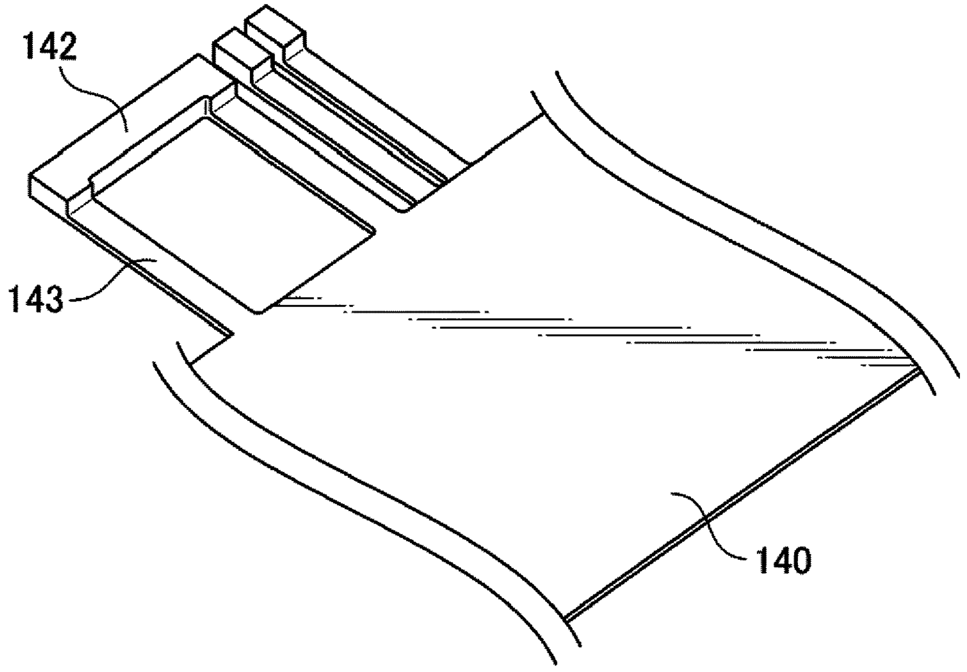
FIG. 10 is a perspective view showing the step of manufacturing the terminals of the connector according to the first embodiment of the present disclosure.

Next, as shown in FIG. 10, the metal plate 140 is punched out such that a portion 142 to be terminals and leads 143 remain.

Figure 11:
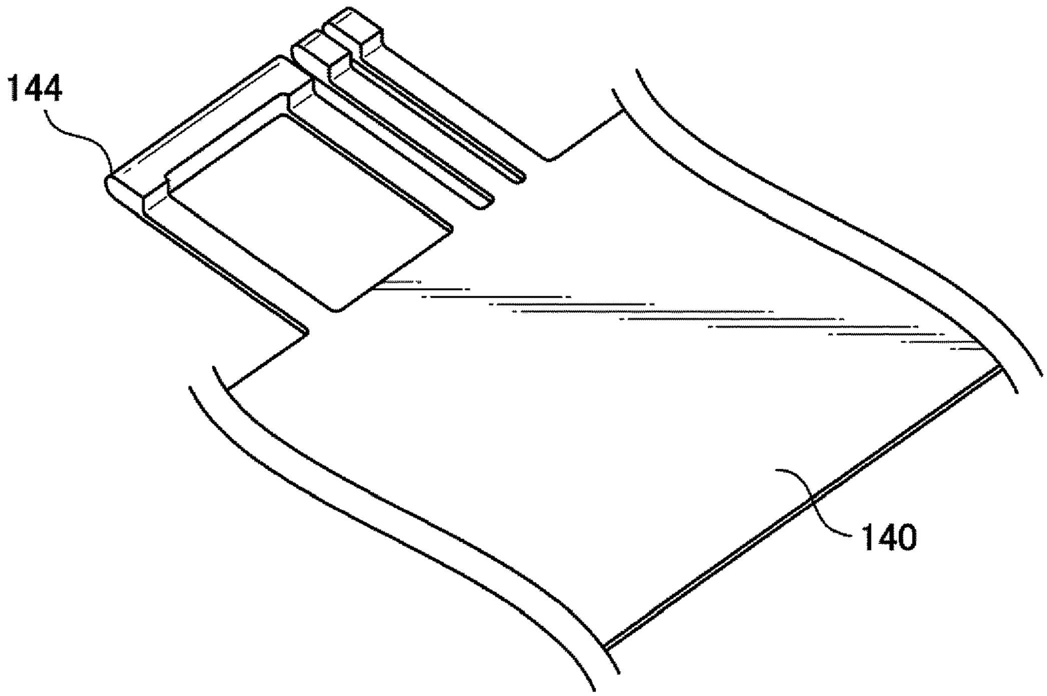
FIG. 11 is a perspective view showing the step of manufacturing the terminals of the connector according to the first embodiment of the present disclosure.

Next, as shown in FIG. 11, tip end portions 144 of the terminals are rounded by crushing (curved surfaces are formed). The tip end portions 144 are to be the fitting surfaces 126, 137.

Figure 12:
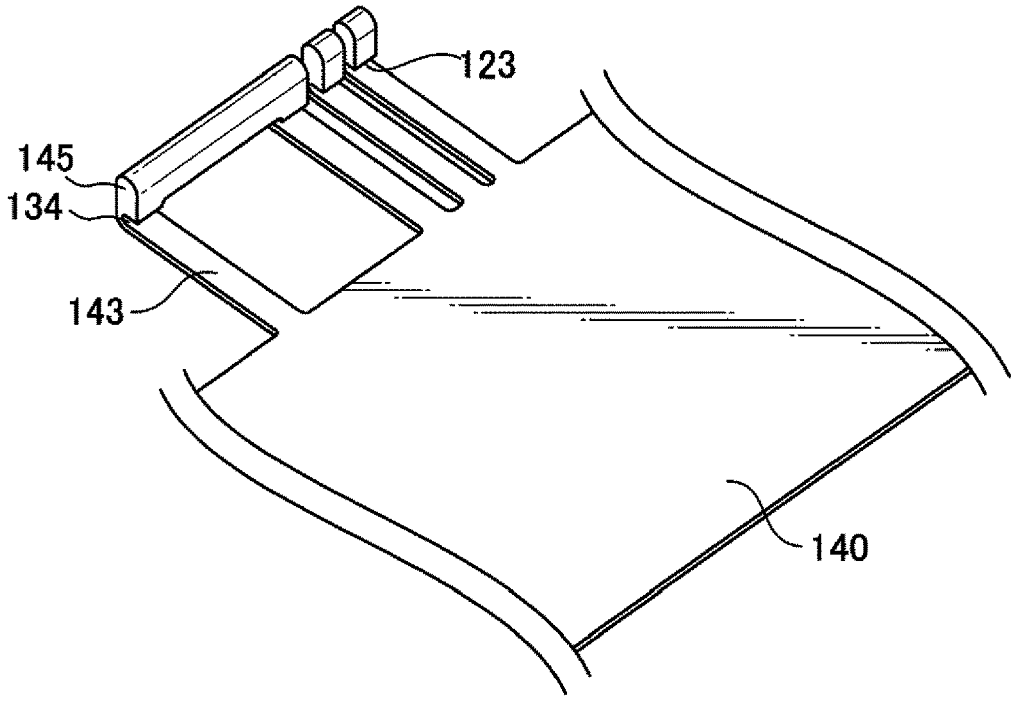
FIG. 12 is a perspective view showing the step of manufacturing the terminals of the connector according to the first embodiment of the present disclosure.

Next, as shown in FIG. 12, thick portions 145 are bent about 90 degrees to form the contact portions 122, 133. At this point, there is a step between the thick portion 145 and a surface of the lead 143, and therefore, the recessed portions 123, 134 are formed inside the bent portions.

Figure 13:
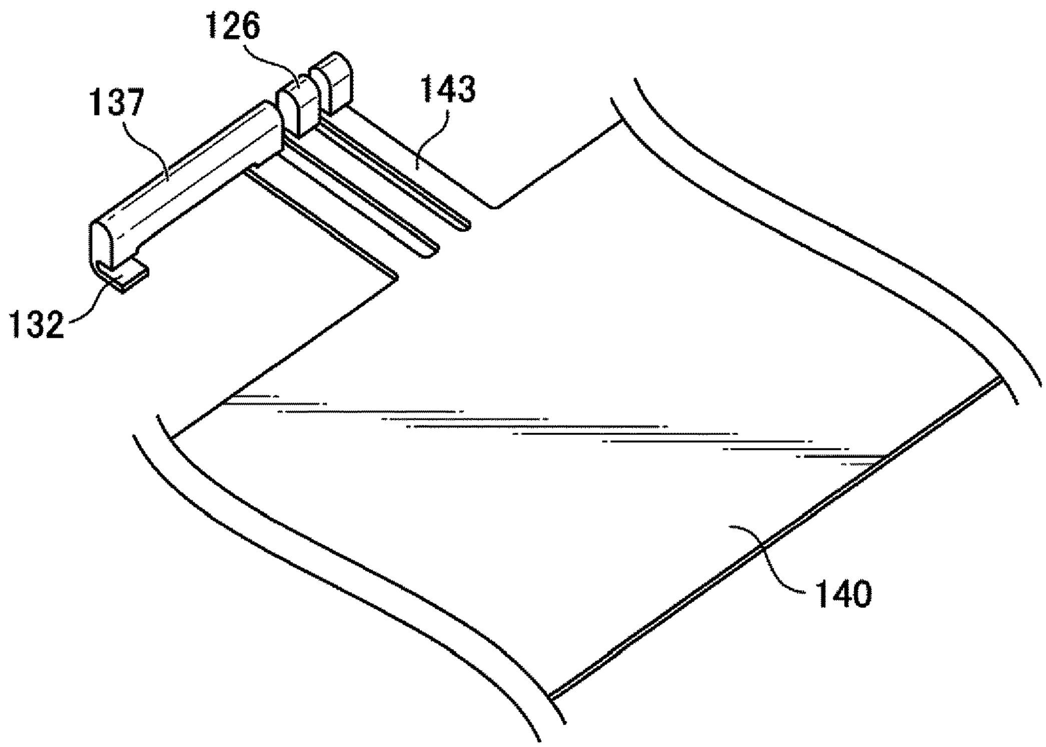
FIG. 13 is a perspective view showing the step of manufacturing the terminals of the connector according to the first embodiment of the present disclosure.

Next, as shown in FIG. 13, part of the lead 143 is punched out, and the mounting portion 132 is separated from the lead 143.

Figure 14:
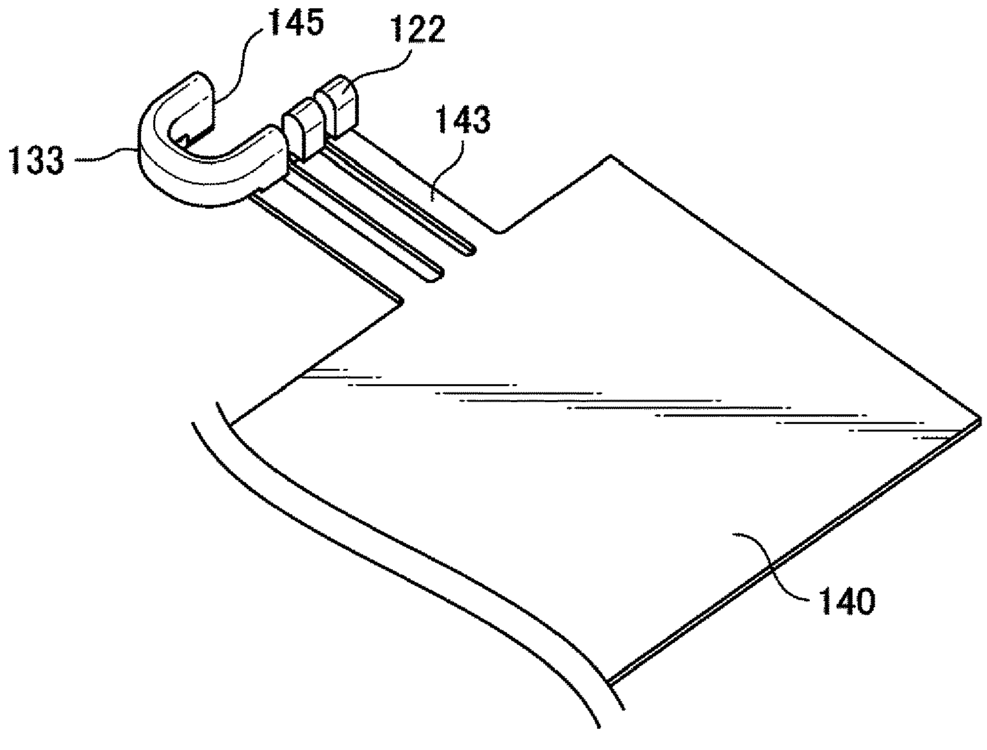
FIG. 14 is a perspective view showing the step of manufacturing the terminals of the connector according to the first embodiment of the present disclosure.

Next, as shown in FIG. 14, the thick portion 145 is bent in a U-shape to form the contact portion 133 of the second terminal 130. At this point, two first terminals 120 and one second terminal 130 are formed.

Subsequently, the same terminals as the two first terminals 120 and the one second terminal 130 as shown in FIG. 14 are arranged rotated 180 degrees, and are fitted in, e.g., the die. Then, resin is injected into the die, and integral molding is performed. Finally, the leads 143 are cut to complete the connector.

Second Embodiment

Figure 15:
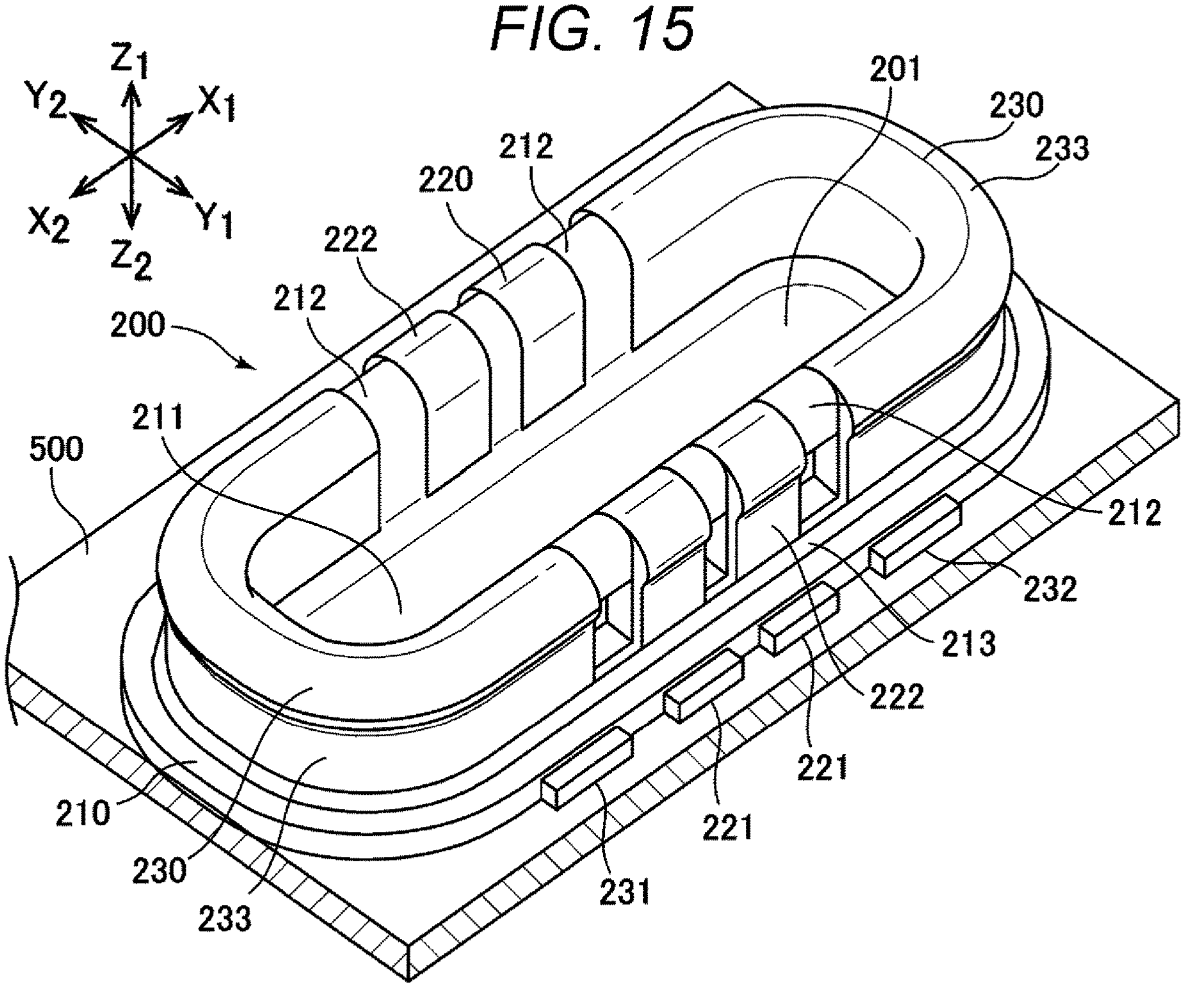
FIG. 15 is a perspective view showing the configuration of a connector (a plug connector) according to a second embodiment of the present disclosure.
Figure 16:
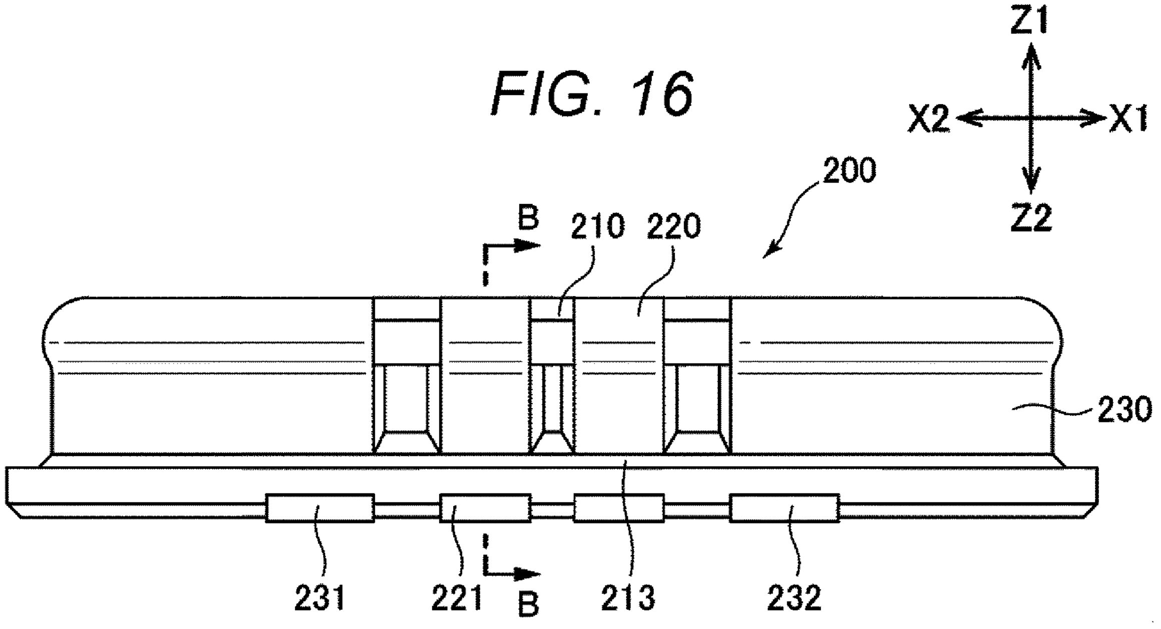
FIG. 16 is a front view showing the configuration of the connector (the plug connector) according to the second embodiment of the present disclosure.
Figure 17:
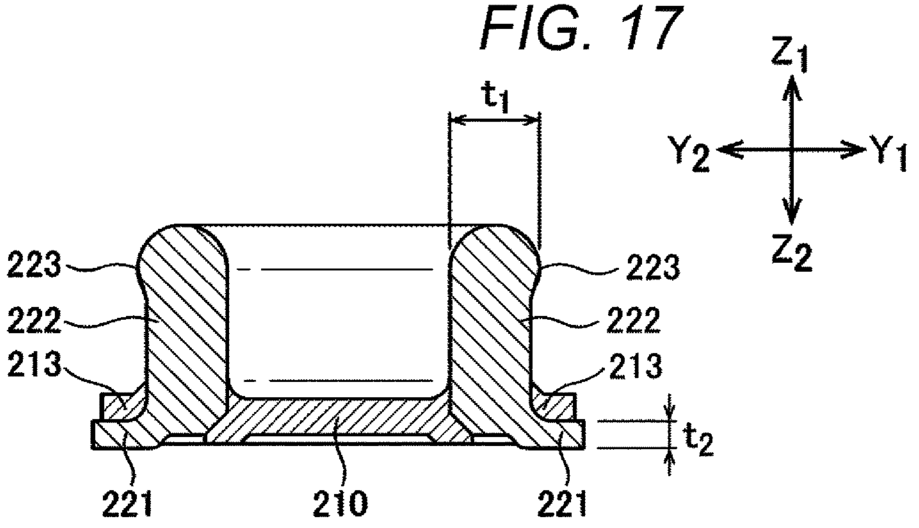
FIG. 17 is a sectional view along a B-B cut plane of FIG. 16.

FIG. 15 is a perspective view showing the configuration of a connector (a plug connector) according to a second embodiment of the present disclosure, and FIG. 16 is a front view. FIG. 17 is a sectional view along a B-B cut plane of FIG. 16.

In the second embodiment of the present disclosure, no recessed portion filled with part of a housing 210 is present between a contact portion 233 and a mounting portion 231, 232 at each of first terminals 220 and second terminals 230, as compared to the first embodiment. Instead of the recessed portion, part (a terminal fixing portion 213) of the housing 210 covers in close contact with surfaces of the mounting portions 231, 232 in a fitting direction (a Z1 direction) so that detachment of the first terminals 220 and the second terminals 230 can be reduced. The configuration of other portions is the same as that of the first embodiment, and therefore, overlapping description thereof will be omitted.

The connector of the second embodiment is a plug connector 200 mounted on a board 500 such as a printed circuit board. The plug connector 200 includes the insulating housing 210, the four conductive first terminals 220 fixed to the housing 210, and the two conductive second terminals 230. Moreover, the first terminal 220 has a greater thickness t1 of a contact portion 222 in a direction (a Y1Y2 direction) parallel with the board 500 than the thickness t2 of a mounting portion 221 in a direction (a Z1Z2 direction) perpendicular to the board 500. For example, the thickness t1 of the contact portion is equal to or greater than twice as much as the thickness t2 of the mounting portion. Moreover, the second terminal 230 has a greater thickness t1 of the contact portion 233 in the direction (the Y1Y2 direction) parallel with the board 500 than the thickness t2 of the mounting portion 231, 232 in the direction (the Z1Z2 direction) perpendicular to the board 500. For example, the thickness t1 of the contact portion 233 is equal to or greater than twice as much as the thickness t2 of the mounting portion 231, 232. At a tip end portion of the contact portion 222, a lock portion 223 for reducing detachment from a partner connector is provided.

The housing 210 includes, for example, a bottom wall 211 forming a bottom surface of a fitting recessed portion 201 of the connector, a side wall 212 standing on the bottom wall 211 to fill a portion between adjacent ones of the terminals, and the terminal fixing portion 213 formed to cover in close contact with part of the first and second terminals 220, 230.

For manufacturing the plug connector 200, a thick portion 141 is formed on the back side of a metal plate 140 at the forging step of FIG. 9 described in the first embodiment. Subsequent steps are the same as those of the first embodiment. At the bending step of FIG. 12, the thick portion 141 is present on the back side, i.e., the outside of the bent portion. Since the inside of the bent portion is flat, no recessed portion is formed.

Third Embodiment

Figure 18:
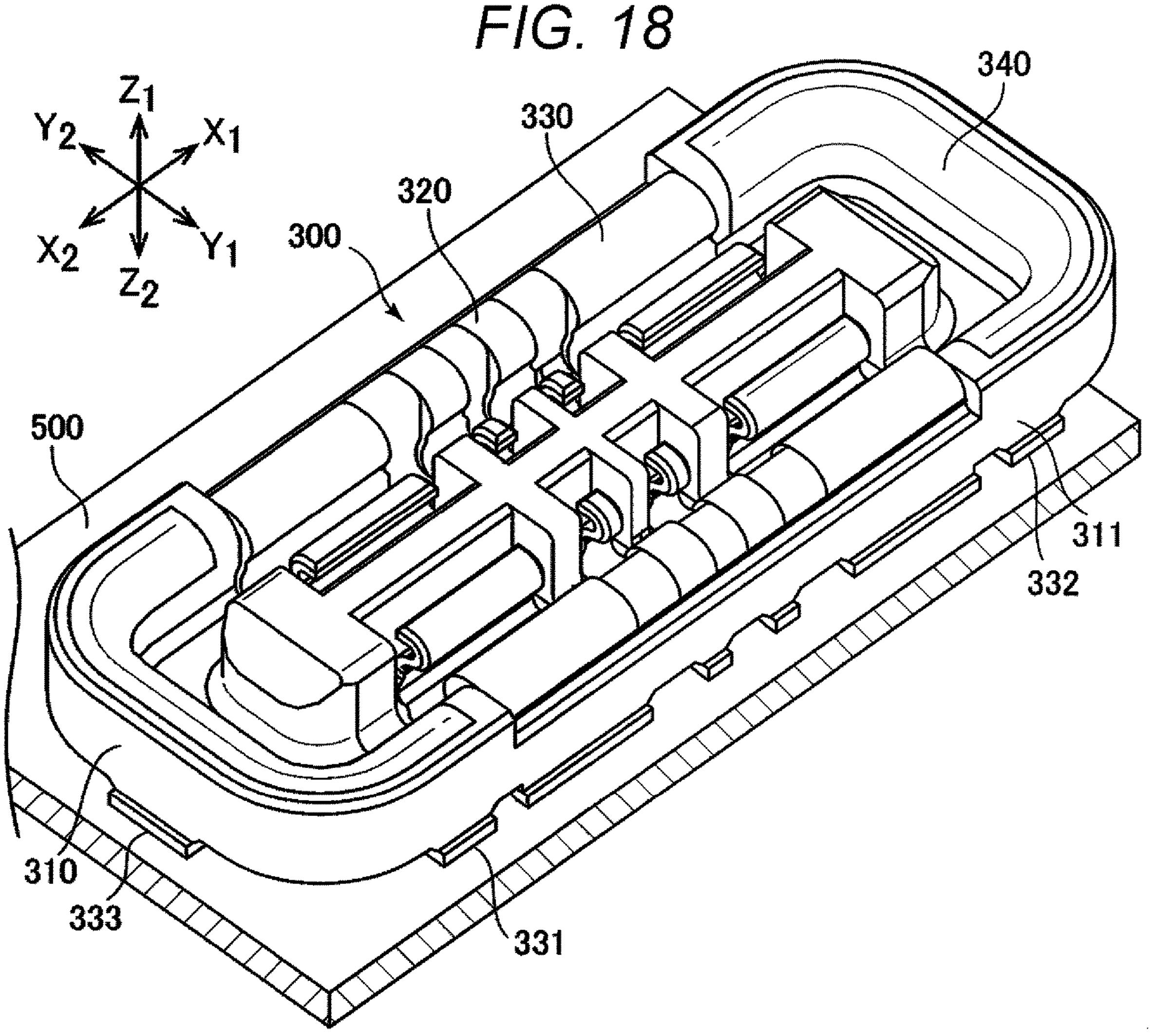
FIG. 18 is a perspective view showing the configuration of a connector (a receptacle connector) according to a third embodiment of the present disclosure.
Figure 19:
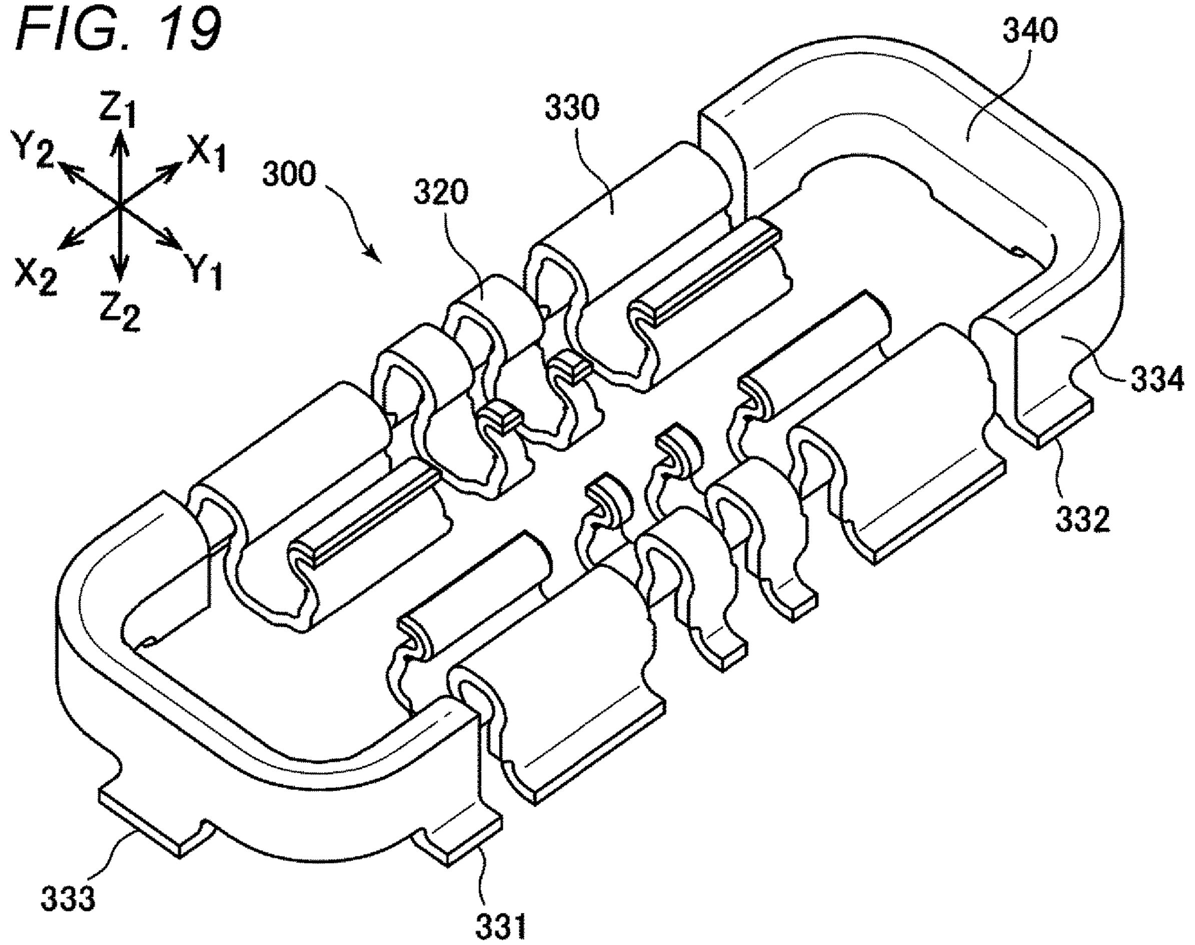
FIG. 19 is a perspective view showing, except for a housing portion, only a terminal configuration in the connector according to the third embodiment of the present disclosure.
Figure 20:
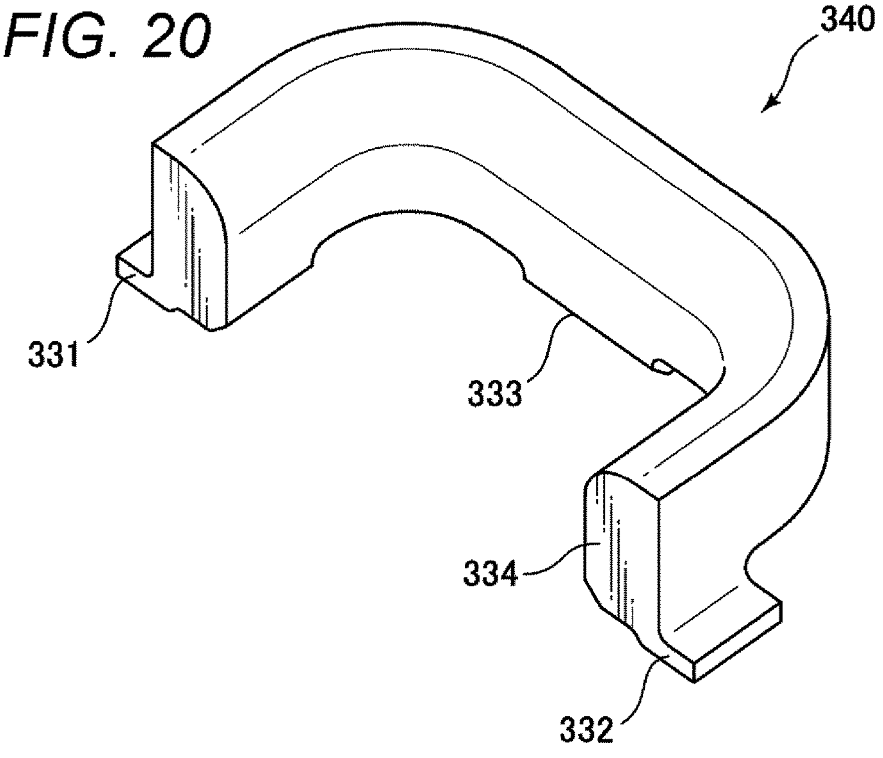
FIG. 20 is a perspective view showing the terminal configuration in the connector according to the third embodiment of the present disclosure.
Figure 21:
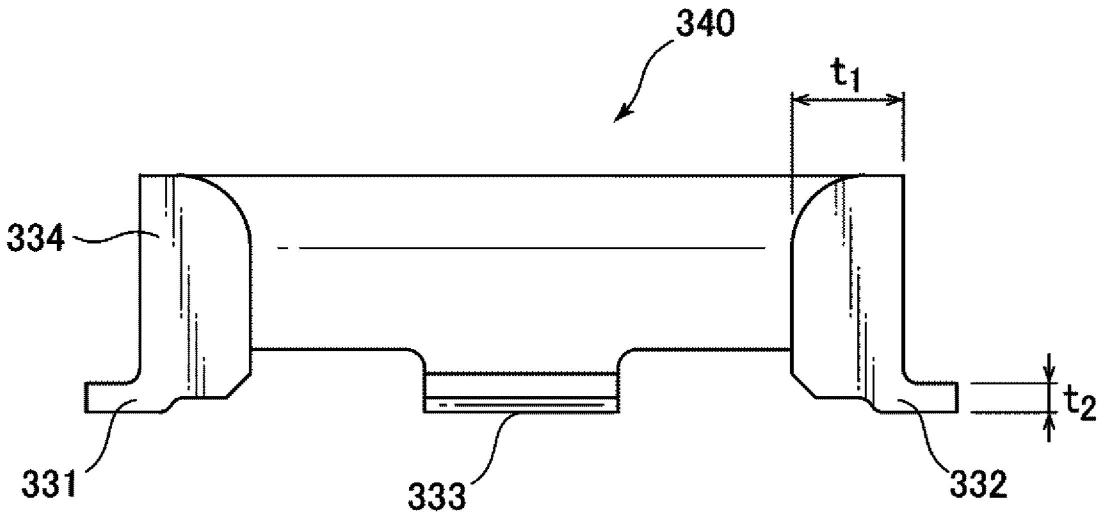
FIG. 21 is a side view showing the terminal configuration of FIG. 20 in the connector according to the third embodiment of the present disclosure.

FIG. 18 is a perspective view showing the configuration of a connector (a receptacle connector) according to a third embodiment of the present disclosure. FIG. 19 is a perspective view showing only a terminal configuration except for a housing portion. FIG. 20 is a perspective view showing the terminal configuration, and FIG. 21 is a side view. Terminals of FIGS. 20 and 21 are also used as reinforcing metal fittings. In the third embodiment, the present disclosure is applied to the receptacle connector. Such a receptacle connector is the same as a normal receptacle connector, except for second terminals 330 (reinforcing metal fittings).

The connector of the third embodiment is a receptacle connector 300 mounted on a board 500 such as a printed circuit board. The receptacle connector 300 includes an insulating housing 310, four conductive first terminals 320 fixed to the housing 310, the four conductive second terminals 330, and two metal third terminals 340. For example, the first terminals 320 are used as signal terminals, the second terminals 330 are used as power supply terminals, and the third terminals 340 are used as grounding (GND) terminals, power supply terminals, or reinforcing metal fittings. The housing 310 has a side wall 311 surrounding the first terminals 320, the second terminals 330, and the third terminals 340. The strength of the connector is increased by the third terminals 340 filled with metal.

As shown in FIGS. 20 and 21, each third terminal 340 has mounting portions 331, 332, 333 to be connected to the board 500 such as the printed circuit board and a contact portion 334 extending to protrude from the mounting portions 331, 332, 333 in a fitting direction (a Z1 direction). The third terminal 340 has a greater thickness t1 of the contact portion 334 in a direction (a Y1Y2 direction) parallel with the board 500 than the thickness t2 of the mounting portion 331, 332, 333 in a direction (a Z1Z2 direction) perpendicular to the board 500. For example, the thickness t1 of the contact portion 334 is equal to or greater than twice as much as the thickness t2 of the mounting portion 331, 332, 333.

Fourth Embodiment

Figure 22:
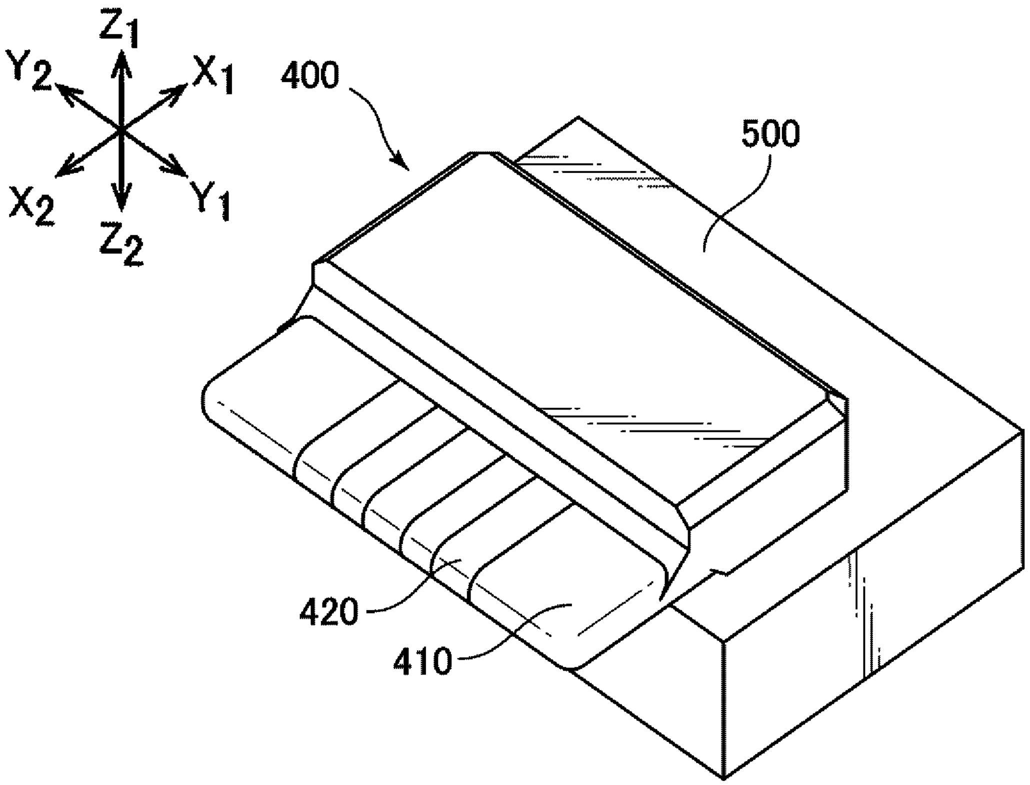
FIG. 22 is a perspective view showing the configuration of a connector (a plug connector) according to a fourth embodiment of the present disclosure.
Figure 23:
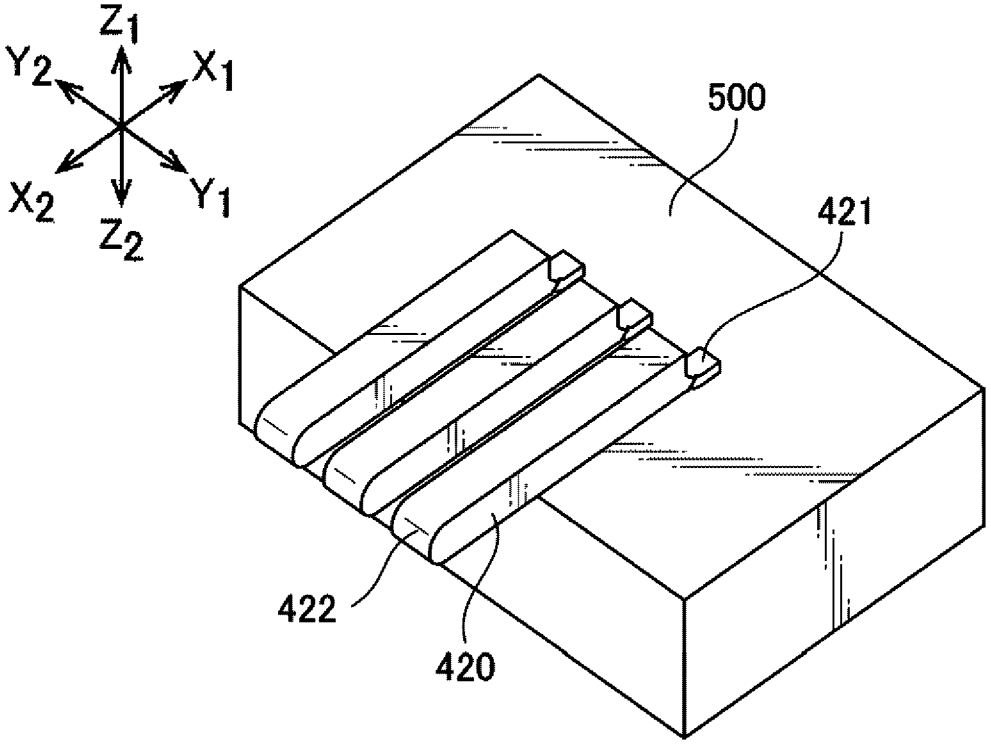
FIG. 23 is a perspective view showing, except for a housing portion, a terminal configuration in the connector according to the fourth embodiment of the present disclosure.
Figure 24:
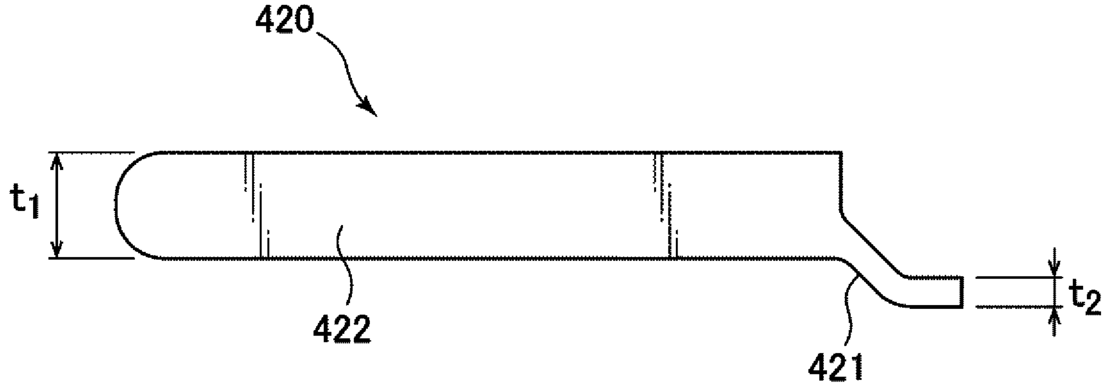
FIG. 24 is a perspective view showing the terminal configuration in the connector according to the fourth embodiment of the present disclosure.

FIG. 22 is a perspective view showing the configuration of a connector (a plug connector) according to a fourth embodiment of the present disclosure, FIG. 23 is a perspective view showing a terminal configuration except for a housing portion, and FIG. 24 is a side view showing the terminal configuration. In the fourth embodiment, the present disclosure is applied to a plug connector to be fitted in a direction parallel with a board. The fitting direction in the present embodiment is not a Z1 direction as in the first to third embodiments, but is a direction (an X2 direction) parallel with a board 500.

The connector of the fourth embodiment is a plug connector 400 mounted on the board 500 such as a printed circuit board. The plug connector 400 includes an insulating housing 410 and three conductive terminals 420 fixed to the housing 410. As shown in FIG. 24, the terminal 420 has a greater thickness t1 of a contact portion 422 in a direction (a Z1Z2 direction) perpendicular to the board 500 than the thickness t2 of a mounting portion 221 in the direction (the Z1Z2 direction) perpendicular to the board 500. For example, the thickness t1 of the contact portion 422 is equal to or greater than twice as much as the thickness t2 of the mounting portion 221. For example, the terminals 420 are used as signal terminals or power supply terminals.

As described above, the terminals of the first to fourth embodiments are not those configured such that contact portions are formed by bending of plate-shaped metal as in a typical case, but those configured such that the inside of contact portions is filled with metal.

Thus, according to the connectors of the first to fourth embodiments, the thickness t1 of the contact portion is greater so that the conductor resistance of the terminal can be decreased. Accordingly, a greater amount of current can be applied to the terminal.

Moreover, the metal volume of the terminal is increased so that the strength of the connector can be improved.

Further, the thickness t2 of the mounting portion is less than the thickness t1 of the contact portion so that reduction in the height of the connector can be achieved.

The invention made by the present inventor(s) has been specifically described above with reference to the embodiments. However, the present disclosure is not limited to the above-described embodiments and various changes can be made without departing from the gist of the present disclosure, needless to say. The first to fourth embodiments may be combined as necessary.

In the first to fourth embodiments, the connector mounted on the board has been described. However, the present disclosure is not limited to such a connector, and can be applied to other connectors.

The connectors according to the first to fourth embodiments can be broadly utilized for industrial, business, and domestic purposes.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A connector comprising:

an insulating housing; and a conductive terminal fixed to the housing, wherein the terminal includes a mounting portion connected to a board and a contact portion protruding from the mounting portion in a fitting direction, the mounting portion comprises a first metal plate, the contact portion comprises a second metal plate connected to the first metal plate via a bent portion, a thickness of the second metal plate is greater than a thickness of the first metal plate.

2. The connector according to claim 1, wherein part of a fitting-side surface of the mounting portion is covered with part of the housing.

3. The connector according to claim 1, wherein the terminal has a recessed portion between the mounting portion and the contact portion, and the inside of the recessed portion is filled with part of the housing.

4. The connector according to claim 1, wherein two side surfaces of the contact portion closely contact part of the housing.

5. The connector according to claim 1, wherein the inside of a fitting surface of the contact portion at a tip end thereof is filled with metal forming the terminal.

6. The connector according to claim 1, wherein the mounting portion of the terminal includes multiple mounting portions, and the contact portion extends in a direction parallel with the board, and electrically connects the multiple mounting portions to each other.

7. The connector according to claim 6, wherein the contact portion has a U-shape as viewed from the fitting direction.

8. The connector according to claim 1, wherein the fitting direction is a direction perpendicular to the board, and the thickness of the second metal plate is a thickness in a direction parallel with the board.

9. The connector according to claim 1, wherein the fitting direction is a direction parallel with the board, and the thickness of the second metal plate is a thickness in a direction perpendicular to the board.

10. The connector according to claim 1, wherein the contact portion is formed by forging.

11. The connector according to claim 1, wherein the thickness of the second metal plate is equal to or greater than twice as much as the thickness of the first metal plate.

* * * * *